United States Patent [19]

Grenn et al.

[11] Patent Number: 5,345,817

[45] Date of Patent: Sep. 13, 1994

[54] MISFIRE DETECTION IN INTERNAL COMBUSTION ENGINES

[75] Inventors: Daniel P. Grenn, Highland; Ronald J. Kubani, Farmington, both of Mich.

[73] Assignee: General Motors Corporation, Detroit, Mich.

[21] Appl. No.: 20,961

[22] Filed: Feb. 22, 1993

[51] Int. Cl.$^5$ ............................................. G01M 15/00
[52] U.S. Cl. ................................. 73/117.3; 364/431.07
[58] Field of Search ........................... 73/116, 117.3; 364/431.07, 431.08; 123/436, 419

[56] References Cited

U.S. PATENT DOCUMENTS

| | | | |
|---|---|---|---|
| 4,064,747 | 12/1977 | Rackliffe et al. | 73/116 |
| 4,179,922 | 12/1979 | Bouverie et al. | 73/116 |
| 4,295,363 | 10/1981 | Buck et al. | 73/117.3 |
| 4,337,647 | 7/1982 | Radcliffe et al. | 73/116 |
| 4,344,140 | 8/1982 | Leung | 364/431.08 |
| 4,532,592 | 7/1985 | Citron et al. | 364/431.05 |
| 4,697,561 | 10/1987 | Citron | 123/339 |
| 4,932,379 | 6/1990 | Tang et al. | 123/436 |
| 5,041,980 | 8/1991 | Maddock et al. | 364/431.03 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,088,318 | 2/1992 | Osawa | 73/117.3 |

OTHER PUBLICATIONS

Plapp et al., "Methods of On-Board Misfire Detection", Electronics Diesel Engine Controls, Feb. 1990.

*Primary Examiner*—Robert Raevis
*Attorney, Agent, or Firm*—Howard N. Conkey

[57] ABSTRACT

Engine combustion malfunctions are detected and the responsible cylinder identified by an approach appropriate to the engine operating point by monitoring change in engine speed in a manner insensitive to engine output shaft tooth-to-tooth spacing variations, substantially linear changes in engine speed, and driveline ringing, such as from rough roads or a previously detected misfire. Multiple misfires may be detected in a single engine cycle.

8 Claims, 9 Drawing Sheets

MISFIRE DETECTION IN INTERNAL COMBUSTION ENGINES

FIELD OF THE INVENTION

The present invention provides a method and apparatus for reliably detecting misfires in internal combustion engines.

BACKGROUND OF THE INVENTION

Catalytic converters are commonly used with conventional internal combustion engines to reduce undesirable constituents in the exhaust gas thereof. The catalyst of these converters is destroyed by unburned fuel passing to, and combusting in a hot converter. Converter life expectancy and efficiency thus deteriorates when the engine passes unburned fuel through to the catalyst, such as when an ignition event fails to completely burn the fuel charge in a cylinder due to an engine misfire. Furthermore, as a catalytic converter converts engine emissions most efficiently when a stoichiometric mixture is properly combusted in the engine, misfires can reduce converter conversion efficiency and increase vehicle emissions.

It is therefore desirable to accurately detect and categorize engine misfires so that those misfires that contribute significantly to increased vehicle emissions or to potential catalytic converter damage may be corrected. It has previously been proposed to detect engine misfire by analyzing engine pressure or by monitoring the engine exhaust gas mixture. Furthermore, because misfire reduces the work output of the engine, thus causing a short period of deceleration after which the engine, through the work contribution of other combustion events, will accelerate to pre-misfire speeds, it has been proposed to compare engine speed in one cylinder firing event to a firing event in another cylinder, so as to provide a relative measure of work output.

Still further, it is known to use an engine speed sensor, such as a position encoder, to monitor the relative average speed between consecutive cylinder events, for the purpose of measuring this relative work. Such position encoders typically take the form of a wheel, with a number of teeth disposed at substantially equidistant positions about its circumference. The wheel is disposed on the engine such that it rotates at an angular velocity proportional to the angular velocity of the engine output shaft.

The difficulty with detecting misfires according to the relative work product of consecutive cylinder combustion events is that, especially at high engine speeds, engine speed is more sensitive to disturbances in the sense that a single engine speed disturbance, such as a misfire, can result in significant deceleration over more than one cylinder event. Additionally, engine speed disturbances can affect engine speed in much the same way as a typical misfire. Furthermore, at high speeds, even slight variations in the distance between teeth on the position encoding wheel can produce significant measurement error which may reduce the integrity of the misfire detecting system.

SUMMARY OF THE INVENTION

The present invention overcomes the shortcomings of the above-described prior art systems by providing different approaches to engine speed analysis for different engine operating ranges. When the engine is in a "high speed" range, wherein a misfire or other engine speed disturbance can affect a multiplicity of engine speed measurements, wherein misfire speed changes can be difficult to distinguish other speed changes, and wherein engine speed measurement is sensitive to the spacing between teeth on the position encoding wheel a "high speed" approach to misfire detection is provided. This approach interprets changes in engine speed over at least one entire engine cycle, so as to account for misfires that decelerate the engine for more than one cylinder event. Furthermore, this approach effectively filters out steady changes in engine speed, as such speed changes are typically not due to misfires. Finally, this "high speed" approach is substantially insensitive to variation in the distance between teeth on position encoders, as it does not compare the timing between consecutive pairs of teeth, but compares the timing between two consecutive passes of the same pair of teeth on the encoder.

In an engine operating range where the high speed sensitivities are not as prevalent, the present invention detects misfires using a "low speed" approach which analyzes data over a shorter test period than the "high speed" approach, making it less sensitive to disturbances of long duration, such as rough driving surfaces. Accordingly, the present invention provides reliable misfire detection over a broad engine operating range, addressing the sensitivities that can change with the engine operating point.

DESCRIPTION OF THE DRAWINGS

The above and other aspects of the invention will become more apparent from the following description taken in conjunction with the accompanying drawings wherein.

DESCRIPTION OF THE PREFERRED EMBODIMENT

Figure 1:
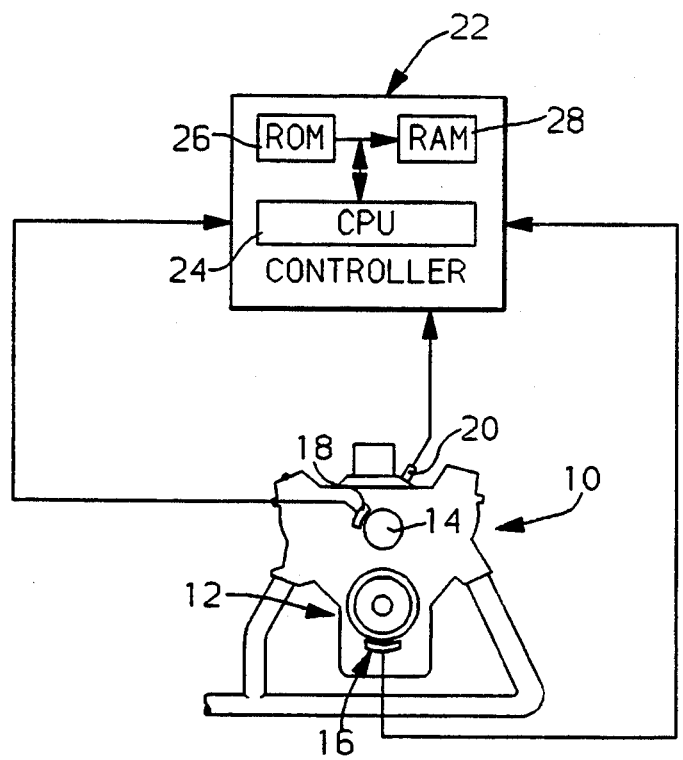
FIG. 1 is a general diagram of the hardware used in carrying out this invention in accord with a preferred embodiment.

Referring to FIG. 1, an internal combustion engine 10 having a crankshaft 12 communicates passage of a plurality of teeth disposed about the circumference of the crankshaft 12 by a conventional wheel speed sensor, such as a variable reluctance sensor 16. The sensor 16 is in position to have a magnetic field generated by the sensor disrupted in a predictable manner by the passage of the teeth. A substantially sinusoidal voltage thus is induced across the sensor with a frequency proportional to the rate of passage of teeth by the sensor 16, which is proportional to the rate of rotation of the crankshaft 12. In this embodiment, two teeth are disposed on the crankshaft in position to pass the sensor 16, such that with the four cycle, four cylinder engine of this embodiment, four teeth pass the sensor 16 for each engine cycle, or one per cylinder power stroke. The sensor 16 output is communicated to an engine controller 22.

A camshaft 14 is provided for engine valve control with a rate of rotation proportional to the rate of rotation of the crankshaft 12. In this embodiment including a four cylinder, four-stroke engine, the camshaft completes one revolution per engine cycle, or rotates at half the angular rate of the engine crankshaft. The speed of rotation of the camshaft may be detected by any conventional wheel speed sensing means, such as with a variable reluctance sensor 18 located so a single tooth (not shown), located on the circumference of the camshaft 14 may pass the sensor 18 in the manner described for the crankshaft 12, wherein a substantially sinusoidal signal is generated by the sensor, the frequency of which is proportional to the angular rate of the camshaft 14. The signal is communicated to the controller 22.

In this embodiment, the tooth on the camshaft is located in a manner coordinated with the location of the teeth on the crankshaft, whereby the camshaft tooth indicates the start of an engine cycle. For instance, the firing order of the four cylinder engine of this embodiment is 1-3-4-2. By positioning the CAM tooth to pass the sensor 18 after the occurrence of the crank event corresponding to the power stroke of cylinder 2, and before that of cylinder 1, the end of an engine cycle is indicated.

A manifold absolute pressure MAP sensor 20 is located in the intake manifold of the engine and communicates MAP to the engine controller 22, for use in the routines of FIGS. 2–7. In an alternative embodiment, a mass airflow sensor (not shown) may be used to measure the mass of air inlet to the engine 10, for example to determine engine load, which is amount of air the engine consumes per cylinder event.

The controller may be an eight bit, single-chip microcomputer, such as a Motorola MC68HC11, having read only memory ROM 26, random access memory RAM 28, and a central processing unit CPU 24. The CPU 24 executes a series of programs to read, condition, and store inputs from vehicle sensors and, with the information provided by the inputs, manage operation of the vehicle.

Among the programs used for vehicle management are those illustrated in FIGS. 2–7. These routines, in accord with this invention, analyze the crankshaft sensor 16 output to determine if the engine is properly combusting its air/fuel charge on a cylinder by cylinder basis.

Figure 2:
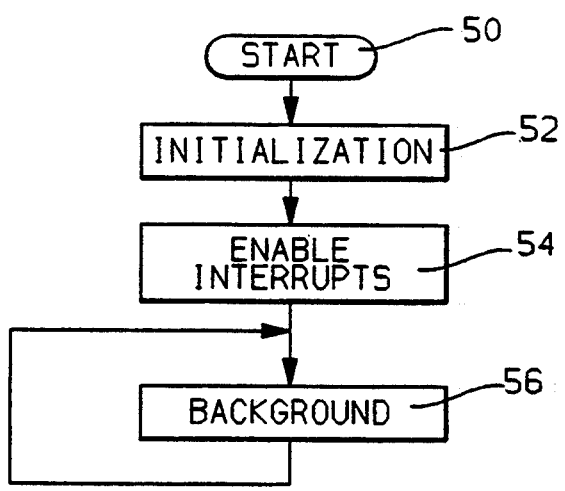
FIGS. 2–7 are computer flow diagrams illustrating the steps involved in executing the preferred embodiment of this invention.

First among these programs is that of FIG. 2, which is executed beginning at step 50 when the controller 22 is started, such as when the vehicle operator rotates the vehicle ignition key to its "on" position. The routine moves to step 52 to carry out general software initialization, such as transferring ROM 26 constants to RAM 28, and setting initial values for software pointers and counters.

The routine next moves to step 54, to enable software interrupts, including conventional event and time based interrupts used to control vehicle functions in a manner well-understood in the art of vehicle control. Specifically in accord with this embodiment, a crankshaft event-driven interrupt is enabled in a conventional manner to occur once per cycle of the sinusoidal signal from the crankshaft speed sensor 16. Additionally, an interrupt vector is set in RAM 28 to vector control to the routine of FIGS. 3–7 on the occurrence of the crankshaft interrupt.

After enabling interrupts and setting up appropriate vectors at step 54, the routine proceeds to step 56 to a background loop which is repeated while the processor is running. The background loop may contain vehicle diagnostic and maintenance routines. These routines will be interrupted upon the occurrence of one of the above-enabled interrupts, such as by the occurrence of a crankshaft interrupt, at which time control will be vectored to the appropriate service routine.

Figure 3:
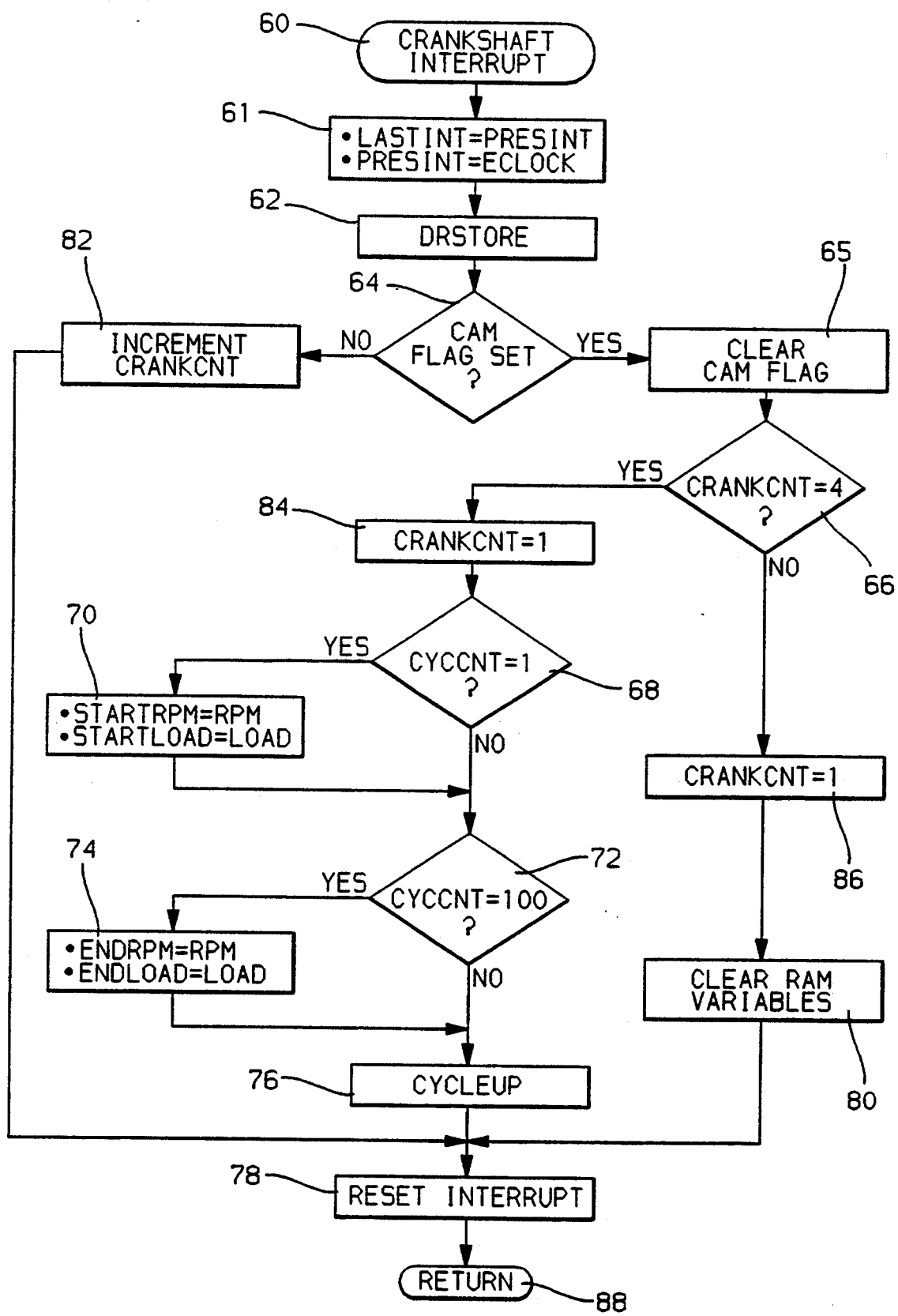
Figure 4:
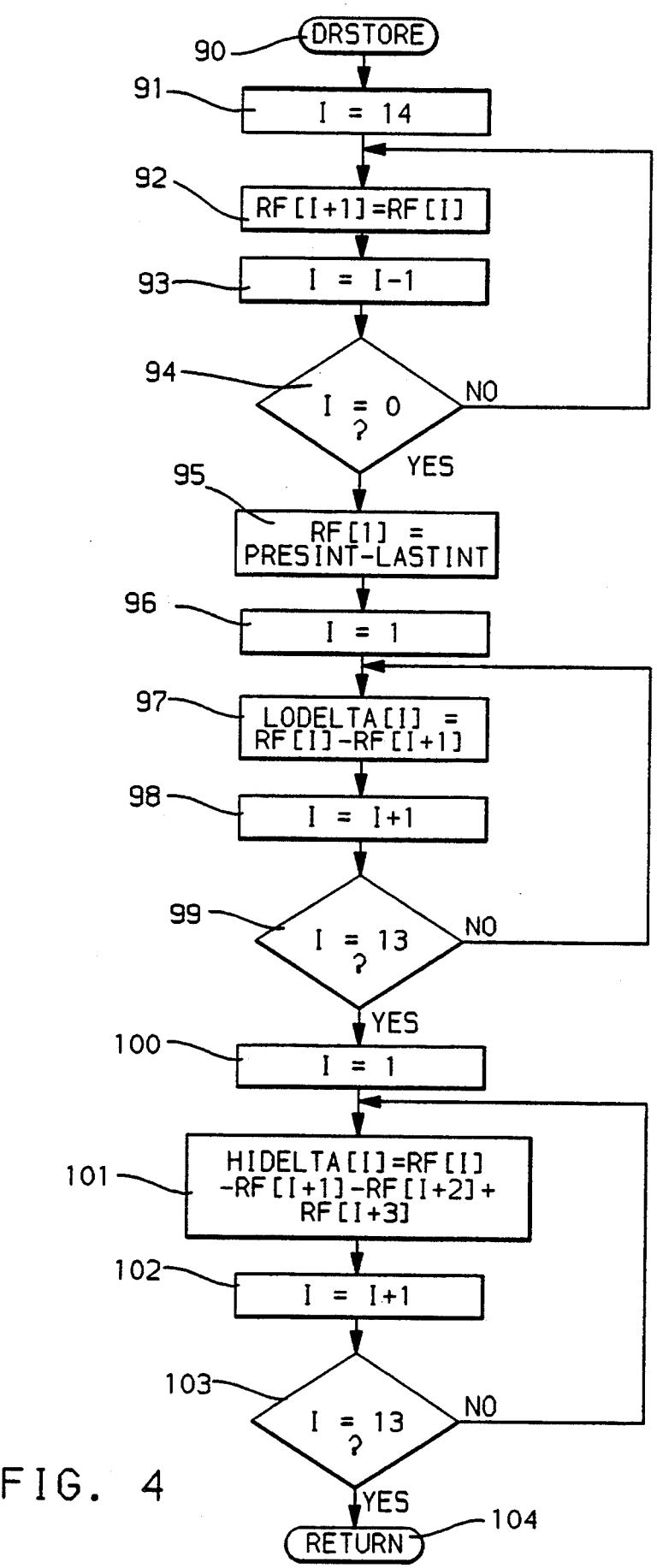

The service routine that operates upon a crankshaft interrupt is illustrated in FIG. 3, and is entered at step 60. The routine moves to step 61 to store the time of the last crank interrupt in RAM variable LASTINT, and to save the time of the present interrupt, as indicated for example by the processor ECLOCK value at the time of the interrupt, in RAM variable PRESINT. The routine then moves to step 62, to execute a routine called DRSTORE, which calculates and stores time information for misfire detection. This routine, to be described, is illustrated in FIG. 4.

The routine next moves to step 64, to determine if the present engine cycle is complete as indicated by the CAM flag being set. The CAM flag is automatically set upon each occurrence of the CAM interrupt, and is cleared at step 65 if found to be set at step 64. The routine of FIG. 3 will monitor crankshaft event timing during an engine cycle and will further scrutinize the timing at the end of a cycle. Accordingly, if the cycle is not complete, the routine will branch from step 64 to step 82 and will increment CRANKCNT, a RAM variable used to monitor the number of crankshaft events between each CAM event. The variable also may be used to synchronize the crank reference signal to the present active cylinder within each engine cycle. After incrementing CRANKCNT, the routine advances to step 78 to re-enable the crank event interrupt routine for the next event. The routine then exits via step 88, at which time it may return to the background routine of FIG. 2, or to any low priority interrupt it was processing at the time the crankshaft interrupt occurred.

Alternatively, if the cycle is determined to be complete and the CAM flag is thus cleared at step 65, the routine moves to step 66, to determine whether the appropriate number of crankshaft events occurred since the last CAM interrupt. As discussed, for a four cylinder engine, the proper number would be four crank events per cam event. If a signal synchronization error occurs, such as a missed crank or CAM event, the control may be mislead. By monitoring the number of crank events per CAM event, the risk of acting on improper or faulty data is reduced.

Accordingly, if at step 66, four crank events have not been counted since the last CAM event, the misfire data being accumulated is assumed to be sufficiently unreliable that it must be discarded, and new data must subsequently be recorded and monitored. Accordingly, if CRANKCNT does not equal four at step 66, the routine resets it to one at step 86, and proceeds to step 80 to clear the variables used to accumulate data over the 100 engine cycle test period. The following RAM variables are reset to zero at step 80: CYCCNT, TRUEMF, NOTRUEMF, and CYLCOUNT[I], for I=1 to 4. These RAM variables will be detailed shortly. The routine then resets the interrupt at step 78, and exits at step 88, as discussed.

Returning to step 66, if four crank events have occurred since the last CAM event, the routine proceeds to step 84 to reset CRANKCNT to 1, indicating the occurrence of the first crank event of the next cycle, and then moves to step 68, to determine if CYCCNT is set to one, which indicates the first cycle of a 100 engine cycle test period. In this embodiment, data is accumulated for 100 engine cycles and then is analyzed for misfire identification. At the start and end of each test period, data points on engine speed RPM and load LOAD are established for later use, as will be detailed.

Specifically, at step 68, if CYCCNT is determined to be set to one, the routine moves to step 70, to store the present engine speed RPM as RAM variable STARTRPM, and to store the present engine load LOAD as RAM variable STARTLOAD. As is well known in the art of engine control, engine load is the mass of air being moved through the engine per cylinder event, and may be calculated in any conventional manner, for instance from engine speed and manifold absolute pressure.

After storing STARTRPM and STARTLOAD at step 70, or if CYCCNT was not determined to be at one at step 68, the routine moves to step 72, to determine whether CYCCNT is set to 100, indicating the last engine cycle of the test period. If CYCCNT is determined to be set to 100 at step 72, the routine advances to step 74 to store the present engine speed and engine load as respective RAM variables ENDRPM and ENDLOAD.

Figure 5A:
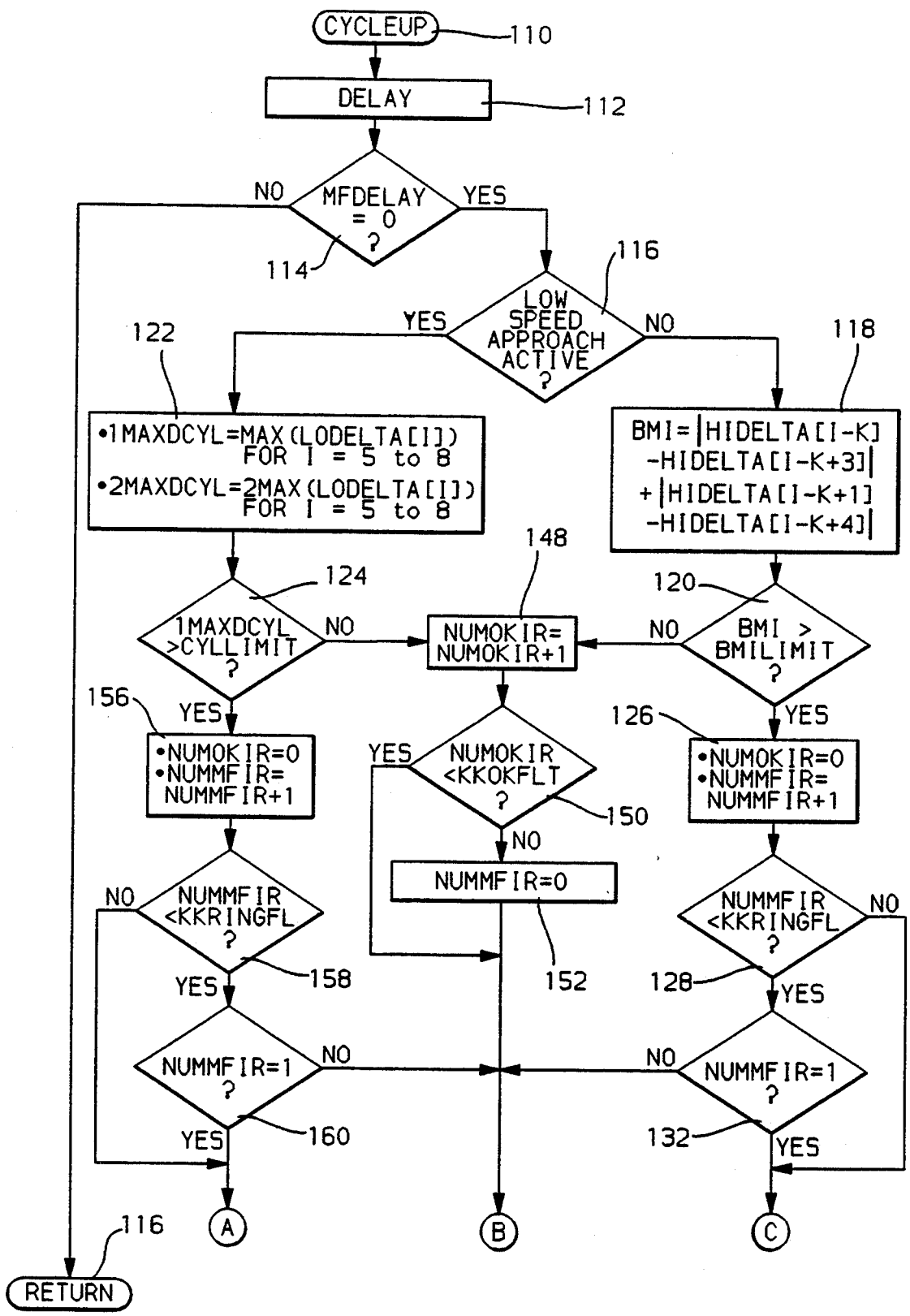
Figure 5B:
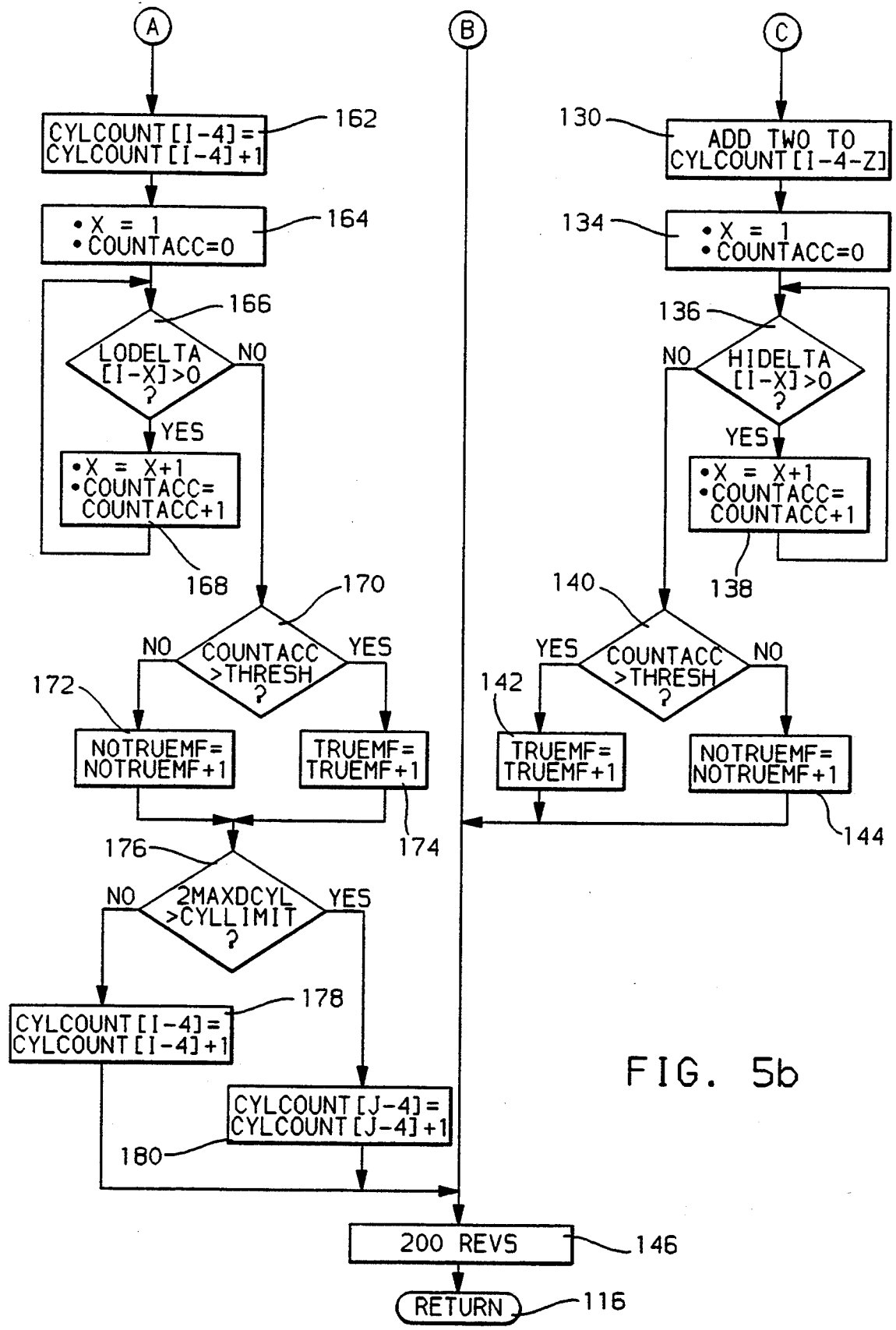

Next, or if the CYCCNT was not determined to be set to 100 at step 72, the routine moves to step 76, to execute a routine to analyze the data of the present engine cycle. This routine, called CYCLEUP, is illustrated in FIG. 5, and will be detailed shortly. After executing CYCLEUP, the routine moves to step 78 to reset the interrupt used to call the routine of FIG. 3, and then exits via step 88, as discussed.

The routine called DRSTORE, which maintains time information for misfire detection, is illustrated in FIG. 4, is called from step 62 of the routine of FIG. 3, and is entered at step 90. This routine is executed on each crankshaft event and generates time difference information between the passage of each tooth on the engine crankshaft 12 (FIG. 1) by the sensor 16 (FIG. 1).

The routine first proceeds to steps 91-95 to generate and update the difference in time between passage of consecutive crankshaft teeth by the sensor 16. Specifically, at step 91, an index I is initialized to 14. The routine then moves to steps 92, 93, and 94 to update the consecutive RF[] values used to store the 15 most recent delta time values, where, for example, RF[15] is the fifteenth most recent time difference between crank event interrupts and RF[2] is the second most recent.

After updating RF[15] to RF[2], the routine moves to step 95 to calculate the most recent RF[] value, RF[1], as the time difference between the last two crank event interrupts, PRESINT-LASTINT. After all fifteen RF[] values are updated, the routine moves to steps 96-99, to likewise update the twelve LODELTA[] values, which are the delta speed values used in a low speed approach to misfire detection, to be described. Generally, steps 96-99 provide the following update for I=1 to 12, LODELTA[I]=RF[I]−RF[I+1].

After the twelve LODELTA[] values are updated, the routine moves to steps 100-103, to likewise update the twelve HIDELTA[] values used in a high speed approach to misfire detection which will be described. This update provides that for I=1 to 12,
HIDELTA[I]=RF[I]−RF[I+1]−RF[I+2]+RF[I+3].

After updating the HIDELTA[] values at steps 100-103, the routine returns to the routine of FIG. 3 via step 104.

The routine used to analyze time difference data upon the completion of each engine cycle is illustrated in FIG. 5, is called from step 76 of the routine of FIG. 3, and is entered at step 110. The routine proceeds to step 112, to execute a delay routine DELAY, illustrated in FIG. 6. As will be described, DELAY generally attempts to shield the routine of FIG. 5 from engine speed transients not indicative of engine misfire by delaying execution of the routine of FIG. 5 until the engine speed transient can be assumed to have been damped out. The delay RAM variable MFDELAY is the delay variable updated by the routine DELAY, and represents an estimate of the number of engine cycles of delay needed before the transient will have significantly decayed away.

Accordingly, after executing DELAY at step 112, the routine moves to step 114, to determine if the variable MFDELAY is non-zero. If non-zero, the routine advances to step 116, to return to step 78 of the routine of FIG. 3 without further action. Otherwise, if MFDELAY is zero, indicating that no obtrusive transients are detected by the routine DELAY, misfire detection in accord with FIG. 5 may continue. The routine thus moves to step 116 to determine whether the high speed approach or the low speed approach should be used to diagnose engine misfires. The low speed approach is generally used when the engine is operating in the low speed region indicated in FIG. 8, and the high speed approach is used in the indicated high speed region. These regions may be calibrated as appropriate for the given engine application with consideration to the differences between the low and high speed approaches.

Figure 8:
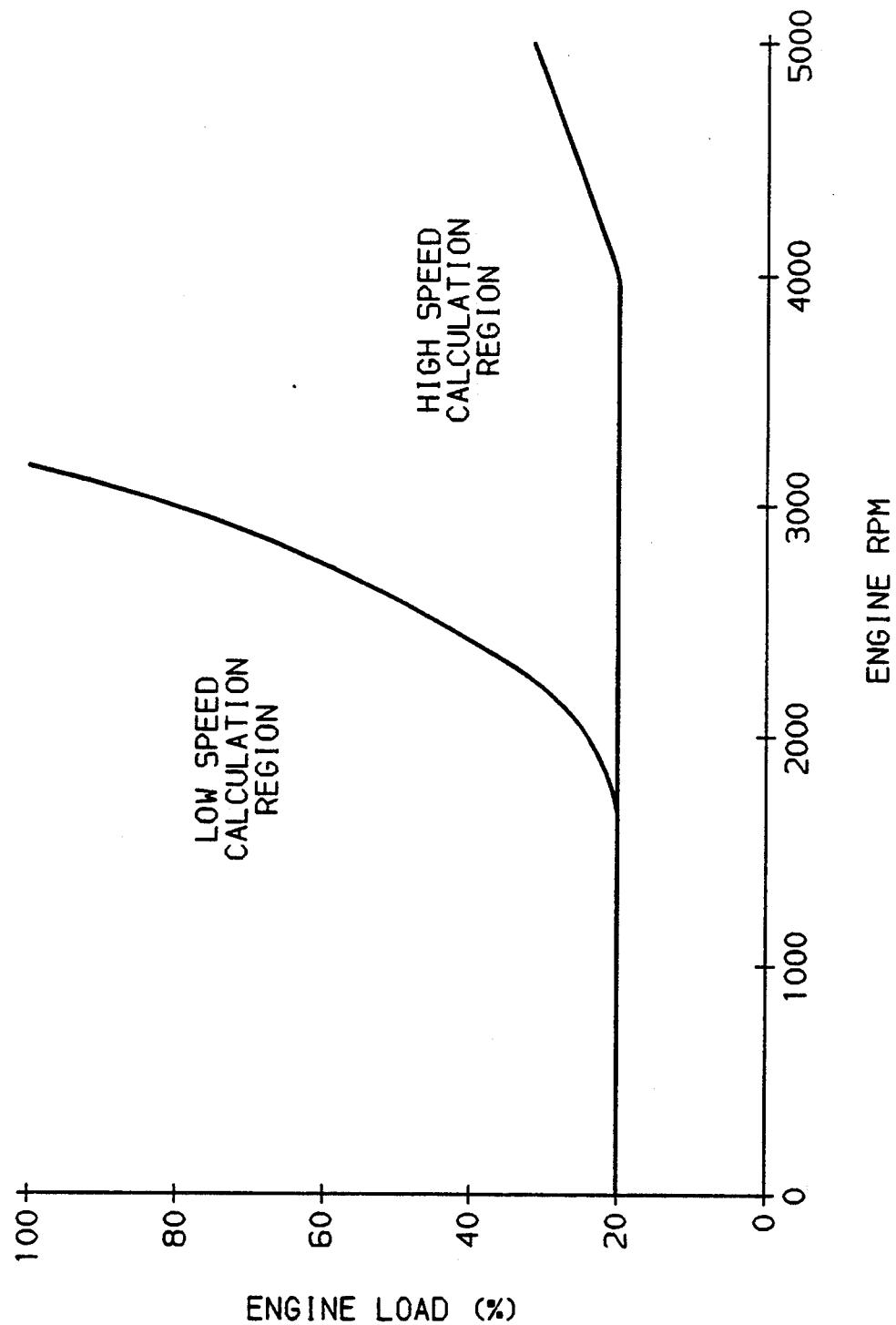
FIG. 8 is a general diagram illustrating the general engine speed and load ranges in which the different misfire detection approaches of this embodiment may be used.

The low speed approach, which will be detailed, generally analyzes the engine acceleration and deceleration between successive crankshaft events over a period of time in searching for possible engine misfires. It is well suited to low engine speeds at higher engine loads, as indicated in FIG. 8. However, when engine speed increases and load drops, it has been recognized that the amount of engine deceleration for a misfire decreases. Accordingly, the low speed algorithm would have to search for smaller changes in speed to accurately detect misfires at higher speeds and lower loads.

Such precision increases the sensitivity of the approach to variations in the spacing between the teeth on the crankshaft. In fact, the spacing variations may lead to apparent decelerations that are larger in magnitude than decelerations caused by misfires themselves. Accordingly, the present embodiment provides a second approach, the high speed approach, to be used when engine speed is above a calibrated threshold while engine load is below a calibrated threshold. The high speed approach is substantially insensitive to variations in tooth spacing, as it monitors deceleration using common points on the crankshaft rather than comparing neighboring points on the shaft. Accordingly, it is more capable of the precise deceleration detection necessary for reliable misfire diagnosis at high speeds.

Furthermore, at high speeds and low loads, a single misfire or a similar engine speed disturbance tends to cause a deceleration that extends beyond a single engine speed measurement. The high speed approach accounts for this effect by analyzing data over entire engine cycles rather than between individual crankshaft events.

However, for this precise misfire detection at high speeds, a substantial amount of data must be analyzed by the high speed approach-much more data than is required for the low speed approach. The high speed approach is therefore more sensitive to engine speed variations of longer duration that are not caused by engine misfire, such as road inputs, than is the low speed approach. Accordingly it is desirable to use the low speed approach in a low speed region, such as that illustrated in FIG. 8, while relegating the high speed approach to the high speed region of FIG. 8.

Returning to FIG. 5, the present engine speed and load are used to determine whether the engine is operating in the high speed region or the low speed region. If in the high speed region, the routine of FIG. 5 moves to step 118 to calculate a Balance Misfire Index BMI as follows $$BMI = |HIDELTA [I-K-HIDELTA [I-K+2]| + | HIDELTA [I-K+1] - HIDELTA [I-K+3]|$$

where I is the index of the largest of HIDELTA(N), where N=5-8, and K is a constant, calibrated as 2 in this embodiment, and ranging from 0-3 in a four cylinder engine. By changing K, the analysis of change in engine speed may be centered around the largest HIDELTA[] value HIDELTA[I], or may be moved slightly ahead of or behind that value. A calibration step will reveal the value of K providing the most telling information on change in engine speed for misfire diagnosis.

The value BMI is a measure of the total amount of variation in the engine cycle represented by the four variables used in the BMI calculation. It magnifies changes in engine speed to discernible levels while remaining insensitive to vehicle acceleration and tooth-to-tooth spacing variations on the crankshaft, by not limiting the analysis to engine speed variations between successive teeth on the crankshaft, but rather by analyzing engine speed changes between common points on the shaft over an entire engine cycle.

After calculating BMI at step 118, the routine proceeds to step 120 to compare BMI to a calibrated limit value BMILIMIT, which represents the maximum change in speed for a given engine speed and load, that typically will not indicate a misfire. In a calibration step, measurement of typical BMI values may be made without misfire present and with forced misfires, at a range of engine speeds and loads. A table of BMILIMIT values may then be quantified as the maximum BMI not associated in the typical case with an engine misfire. As such values tend to vary with engine speed and load, they may be stored in ROM 26 and referenced from the table as a function of present engine speed and load.

If BMI exceeds the BMILIMIT referenced from the table for the present engine speed and load at step 120, a misfire may have occurred, and the routine moves to 126 to indicate the potential misfire condition by clearing the counter NUMOKIR and incrementing the counter NUMMFIR. NUMOKIR is a RAM counter indicating the number of OKs in a row, which is the number of engine cycles in a row in which there were no detected potential misfires. NUMMFIR is a RAM counter indicating the number of potential misfires in a row. Next, the routine moves to step 128 to determine if the number of misfires in a row exceeds a calibrated value KKRINGFL, which represents the number of engine cycles that a typical misfire will continue to manifest itself as excessive driveline ringing to the extent that it may appear as additional potential misfires. In other words, the amount of damping in a powertrain affects the amount of time a misfire will continue to affect engine speed. By monitoring the amount of time required to damp out a typical misfire, one may set KKRINGFL to a value equal to the number of engine cycles of delay needed before a misfire is substantially damped out, such that subsequent misfires may be detected after the delay without significant concern that the prior misfire will pollute the engine speed information.

In this embodiment, KKRINGFL is set to 2. If, at step 128, NUMMFIR exceeds or is equal to the delay KKRINGFL, the routine moves to step 130, to determine whether the potential misfire, which is assumed not to be mere higher order effects of a prior misfire, can be assumed to be a true misfire, or is just a false alarm. Alternatively, if NUMMFIR is less than KKRINGFL at step 128, the routine moves to step 132, to determine if the present potential misfire is the first misfire in a row. If so, the potential misfire could be a true misfire and further investigation must be made, again starting at step 130.

At step 130, two is added to a counter CYLCOUNT[] dedicated to a single cylinder of the engine. Two is added to synchronize the high speed misfire detection with low speed detection, to be discussed. Each cylinder in this embodiment has a dedicated counter CYLCOUNT[] for counting the number of potential misfires detected and attributed to that cylinder.

Accordingly, the present invention as illustrated in this embodiment is capable of diagnosing engine misfires on a cylinder by cylinder basis. Specifically at step 130, two is added to CLYCOUNT[I−4−Z]. The index I−4−Z points to the potentially misfiring cylinder, where I is the index that points to the largest of the fifth through eighth HIDELTA[] values, the number 4 is subtracted from I to point to the sequence number of the cylinder in the four cylinder engine of this embodiment corresponding to that largest HIDELTA[] value, and Z is a calibrated offset to compensate for system lag. For example, if I=5, indicating the HIDELTA[5] had the greatest magnitude of HIDELTA[5] through HIDELTA[8], then in the four cylinder engine of this embodiment, the last cylinder of the firing order (the most recent event recorded for that engine cycle) is attributed with that highest value, and the counter dedicated to that first cylinder is pointed to by subtracting 4 from I, and system lag is accounted for by subtracting Z from that value.

It should be noted that the index does not point to the cylinder number per se, but to the number in the firing order, starting from the most recently recorded cylinder (the last one recorded for the engine cycle) to the least recently recorded cylinder. Furthermore, the number ranges from 1 to 4, so that simple corrections may be required if, for instance, the result of I−4−Z is less than 1. For example, if I−−−−Z equals −1, it would point to the third most recent recorded cylinder, or the second in the firing order.

After adding two to the appropriate cylinder counter, the routine moves to steps 134–140, to determine if the potential misfire can be assumed to be a true misfire. It has been determined that the deceleration caused by a misfire will endure for only a short period of time. Therefore, any deceleration of long duration indicates that it is likely some disturbance other than a misfire caused the deceleration, such as a rough road. Accordingly, by monitoring the period of time the engine decelerates after a potential misfire, further evidence of whether a misfire occurred is provided.

Specifically, after step 130, the routine moves to step 134, to set X, an index offset, to one and to clear COUNTDEC, which is used to count the number of positive HIDELTA[] values after HIDELTA[I]. Next, the routine moves to step 136, to determine whether HIDELTA[I−X], which is the HIDELTA[] value that is X crank events more recent than HIDELTA[I], is greater than zero, which would indicate post-potential misfire deceleration. If it is greater than zero, the routine advances to step 138 to count that deceleration by incrementing COUNTDEC, and bumps X by one to point to the more recent consecutive HIDELTA[] value. The routine then returns to step 136 to compare that more recent value to zero.

The routine continues to count the positive consecutive HIDELTA[] values until one is found that is less than or equal to zero, indicating no deceleration. When such a HIDELTA[] is detected, the routine moves to step 140, to compare COUNTDEC, the counted number of consecutive positive values, to a calibrated threshold value THRESH, which is set to 4 in this embodiment. If COUNTDEC exceeds THRESH, the deceleration endured for too long to evidence a typical misfire, and the routine moves to step 144 to increment NOTRUEMF, a count stored in RAM 28 (FIG. 1) of the number of likely false alarms, which are potential misfires which were followed by an extended period of deceleration.

Alternatively at step 140, if COUNTDEC does not exceed THRESH, the deceleration duration was consistent with a typical misfire deceleration duration, and the routine moves to step 142, to increment TRUEMF, a count stored in RAM 28 (FIG. 1) of the number of likely true misfires. After incrementing the appropriate counter, the routine moves to step 146 to execute a routine called 200REVS, illustrated in FIG. 7, to be described.

Returning to step 120, if BMI does not exceed BMILIMIT, there has been no detected substantial change in engine speed that might indicate a misfire, and the routine moves to step 148 to increment a counter called NUMOKIR, which is a RAM counter used to count the number of no misfire engine cycles in a row. This counter is limited so it does not overflow. For instance, in the preferred embodiment, the NUMOKIR is eight bits, and is limited to 255.

Next the routine moves to step 150, to compare NUMOKIR to KKOKFLT, a calibrated counter threshold value set to 2 in this embodiment. If NUMOKIR exceeds or is equal to KKOKFLT, a sufficient number of no misfire cycles have occurred in a row that a counter used to indicate the number of misfires in a row NUMMFIR may be cleared at step 152. Alternatively, if NUMOKIR does not exceed KKOKFLT at step 150, step 152 is bypassed. Whether NUMMFIR is reset or not at step 152, the routine next proceeds to step 146, to execute the routine 200REVS illustrated in FIG. 7, to be discussed.

Returning to step 116, if the present engine speed and load indicate that the low speed approach should be used, the routine moves to step 122 to calculate 1MAXDCYL and 2MAXDCYL as follows 1MAXDCYL=MAX (LODELTA[I]) for I=5 to 8

2MAXDCYL=2MAX (LODELTA[I]) for I=5 to 8, where MAX(X) is the maximum value of the range X, and 2MAX(X) is the second highest value of the range X.

Thus 1MAXDCYL represents the greatest change in speed over the fifth to eighth most recent crank events, and 2MAXDCYL is the second greatest change in speed over that period. Both of these changes in speed are further analyzed to better characterize the engine speed activity that may indicate a misfire, as will be described.

After calculating these values, the routine moves to step 124, to compare 1MAXDCYL to a calibrated speed change limit CYLLIMIT, above which a change in engine speed may indicate a misfire. In this embodiment, CYLLIMIT changes with engine speed and load, and is determined as a function of speed and load in a calibration step and stored in a table which is referenced by speed and load. In the manner discussed at step 120 of this routine, the entries in the table are calibrated as the maximum amount of speed change not associated with the typical misfire. If 1MAXDCYL does not exceed CYLLIMIT, the routine moves to steps 148-152 to indicate the no potential misfire condition in the manner described for the high speed approach. Otherwise, the routine proceeds to step 156, to clear the counter NUMOKIR, which, as described at step 126, counts the consecutive engine cycles in which no potential misfire was detected. Also at step 156, the counter NUMMFIR is incremented, to indicate a misfire. As stated earlier at step 126, NUMMFIR counts the number of engine cycles in a row in which a potential misfire was detected.

Next, the routine advances to step 158, to compare NUMMFIR to KKRINGFL which, as described for step 128, is a delay to allow the higher order engine speed effects of prior potential misfires to damp out. As described for steps 128 and 132, if at step 158 NUMMFIR exceeds or is equal to the delay KKRINGFL or if at step 160 NUMMFIR equals one, the routine moves to step 162 to further analyze the potential misfire. Alternatively, if NUMMFIR is less than KKRINGFL at step 158 and NUMMFIR is not one at step 160, the routine moves to step 146 to discontinue further analysis of potential misfires for the present engine cycle.

The upcoming steps 162-180 further analyze low speed misfire data. To proceed with these steps the routine first advances to step 162 as described, to increment CYLCOUNT[I−4], where I is the number of the cylinder that identified 1MAXDCYL at step 122. For instance, if the maximum LODELTA[] value over the fifth to eighth LODELTA[] value range was LODELTA[7], the number I would be set to seven, and CYLCOUNT[3] would be incremented at step 162, as the maximum change in engine speed was attributed to a potential misfire in the third most recent cylinder in the firing order. In a firing order 1-3-4-2, this would identify cylinder number 3.

Next, the routine proceeds to steps 164-170, to determine whether corroborating evidence is present that a misfire occurred, as was discussed for steps 134-140. Again, a misfire typically is followed by a brief period of slight engine deceleration, and longer periods of deceleration typically indicate some other type of engine speed disturbance. Steps 164-170 thus simply count the number of crank events in which the engine decelerated following the potential misfire. Specifically, an index X is initialized to one at step 164, and COUNTDEC, a count of the number of deceleration events after the potential misfire, is cleared.

Next, the routine moves to step 166 to compare deceleration values after the potential misfire LODELTA[I-X] to zero. Values greater than zero indicate deceleration, and the steps 166 and 168 count the number of consecutive deceleration values, if any, after the potential misfire. Once a non-deceleration crank event is found the counting stops, and the routine moves to step 170 to compare the count COUNTDEC to a threshold value THRESH, calibrated to 2 in this embodiment. If COUNTDEC is less than or equal to THRESH, the deceleration period after the potential misfire was consistent with a misfire, and the routine moves to step 174 to increment the counter TRUEMF. Otherwise, a false indication of a misfire may be present, and the routine moves to indicate this by incrementing NOTRUEMF at step 172.

After incrementing the appropriate counter at steps 172 or 174, the routine moves to step 176, to compare the second highest change in speed 2MAXDCYL, to CYLLIMIT, the potential misfire threshold value used to determine if 1MAXDCYL indicated a potential misfire at step 124. This second compare provides for detection of two misfires per engine cycle, as it is not necessarily the largest change in engine speed that indicates a misfire condition, but rather the change in engine speed exceeding CYLLIMIT.

If two LODELTA[] values exceed the threshold CYLLIMIT, the inventors intend in this embodiment that neither be eliminated from suspicion of a misfire. Accordingly, the two counters used to monitor potential misfire activity for those two cylinders are both incremented. However, if just one LODELTA[] exceeds the threshold, the high confidence that the associated cylinder is in fact the culprit justifies an increased gain on the counter associated with that cylinder. Thus instead of adding just one to that counter, two is added.

As discussed at step 130, these counters are stored in RAM and are called CYLCOUNT[]. At step 130, for the high speed approach, two was added to the cylinder counter in the presence of a potential misfire, due to the improved confidence in the high speed approach over the low speed approach in the high speed range of FIG. 8.

Returning to step 176 of the low speed approach, if 2MAXDCYL exceeds CYLLIMIT, the routine moves to step 180, to increment the counter associated with that second highest cylinder, called CYLCOUNT[J−4], where J is the number of the cylinder that identified 2MAXDCYL at step 122. For instance, referring to step 122, if the second highest LODELTA[] value over the fifth to eighth LODELTA[] value range was LODELTA[6], J at step 180 would be 6. Alternatively, if 2MAXDCYL does not exceed CYLLIMIT at step 176, the routine proceeds to step 178, to increment CYLCOUNT[I−4] a second time, reflecting the high confidence, as discussed. The routine, after incrementing the appropriate counter at either step 178 or 180, moves to step 146 to execute the routine 200REVS, as discussed. The routine then returns to the calling routine of FIG. 3, via step 116.

Figure 6:
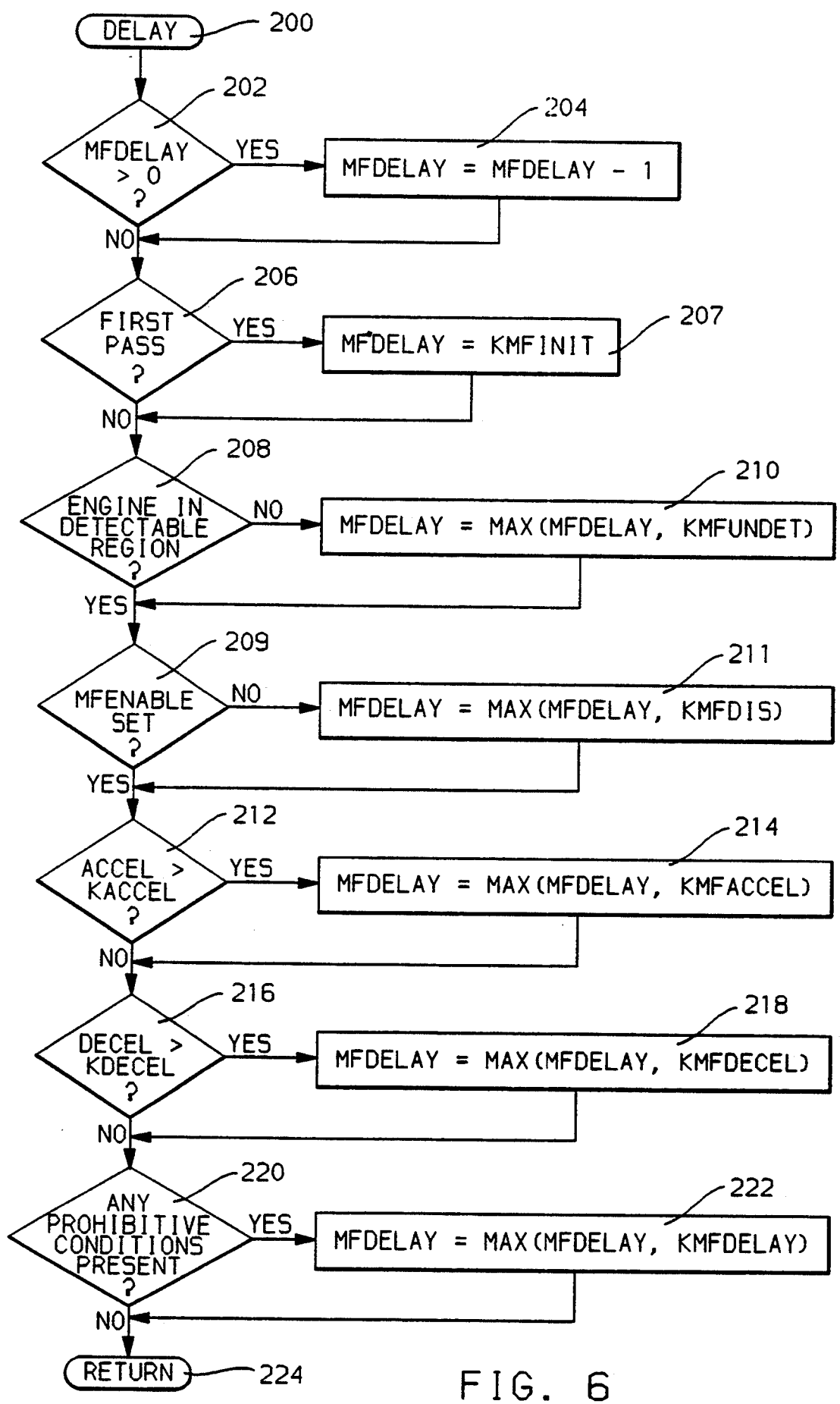

The misfire delay routine DELAY is illustrated in FIG. 6 and is entered at step 200. The routine proceeds to step 202 to check the counter that maintains the delay MFDELAY. If the counter is not already at zero at step 202, the routine decrements it at step 204. Next, the routine advances to step 206 to determine if this is the first pass of the routine of FIG. 6 since RAM has been initialized, such as when the controller 22 was just powered up. If it is the first pass, the routine moves to step 207 to initialize MFDELAY to the value KMFINIT, set to ten in this embodiment.

In either case, the routine next moves to step 208, to determine whether the engine is in a region defined by engine speed and load in which misfires are detectable by the routine of this embodiment. For instance, the engine speed and load must be above calibrated minimum values to provide an environment suited to the misfire detection of this embodiment. If engine speed and load indicate the engine is not in a "detectable" region, the routine delays misfire detection by proceeding to step 210 to reset MFDELAY to KMFUNDET, unless MFDELAY already exceeds KMFUNDET.

Next, or if the engine is determined at step 208 to be in the detectable region, the routine then moves to step 209, to determine the general health of the sensors needed in the misfire detection of this embodiment. These sensors may include the throttle position sensor (not shown), the vehicle speed sensor 16 (FIG. 1), the CAM sensor 18 (FIG. 1), the manifold absolute pressure sensor 20, a mass airflow sensor (not shown) which can be used in an engine load determination for an alternative embodiment of this invention, and a coolant temperature sensor (not shown).

Furthermore at step 209, the status of the torque converter clutch TCC (not shown) is ascertained. If the general powertrain control has forced the TCC on, such as when the transmission is hot, the misfire detection of this embodiment is delayed, as it is an important aspect of this embodiment that the TCC be disabled temporarily when a potential misfire has been detected, to improve confidence in any subsequent misfire diagnoses, as will be described.

Returning to step 209, if a sensor malfunction is found, such as by a flag having been set from any conventional diagnostic routine that may be operating in the powertrain control that may be resident, consistent with well-known practices, or if the TCC is presently forced on, the routine moves to step 211 to set MFDELAY at least to KMFDIS, a ROM constant set to twenty in this embodiment.

The routine then moves to step 212 to determine if the engine is accelerating above a threshold amount of acceleration KACCEL, which is calibrated as ten in this embodiment. If so, the consequent significant changes in engine speed will bar use of the routine of this embodiment, which relies on change in engine speed to detect misfire. If the engine is accelerating at an amount greater than KACCEL at step 212, MFDELAY is reset if necessary to KMFACCEL at step 214.

Next, the routine determines the magnitude of any deceleration that may be taking place in the engine at step 216. If the engine is decelerating at an amount greater than KDECEL at step 216, MFDELAY is reset if necessary at step 218 to KMFDECEL. KDECEL is calibrated to ten in this embodiment.

The routine then moves to step 220, to check any of a number of conditions that may bar execution of the misfire detection routines of this embodiment, such as a rapidly changing throttle position sensor, an active EGR diagnostic, an active air injection system diagnostic, an active deceleration fuel cutoff, an active fuel shutoff, an air conditioning compressor clutch in transition from on to off or from off to on, or any conventionally known condition that would likely introduce perturbation into the engine speed system in a manner that would affect engine speed. If any such condition is present, and the above list is not meant to be exhaustive, MFDELAY is reset, if necessary, to KMFDELAY at step 222. The routine is then exited after steps 220 and 222 via step 224, and control returns to the routine of FIG. 5.

Figure 7A:
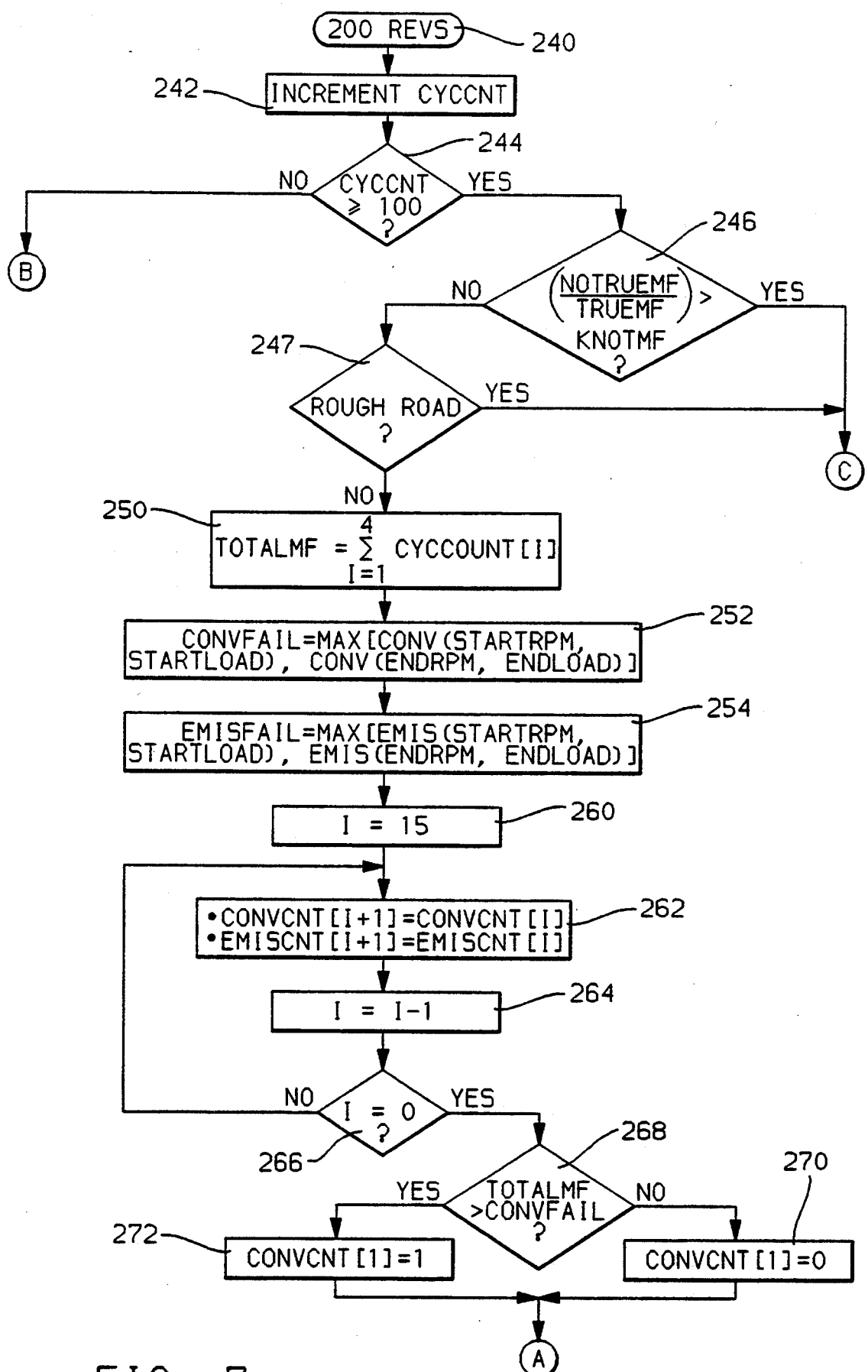
Figure 7B:
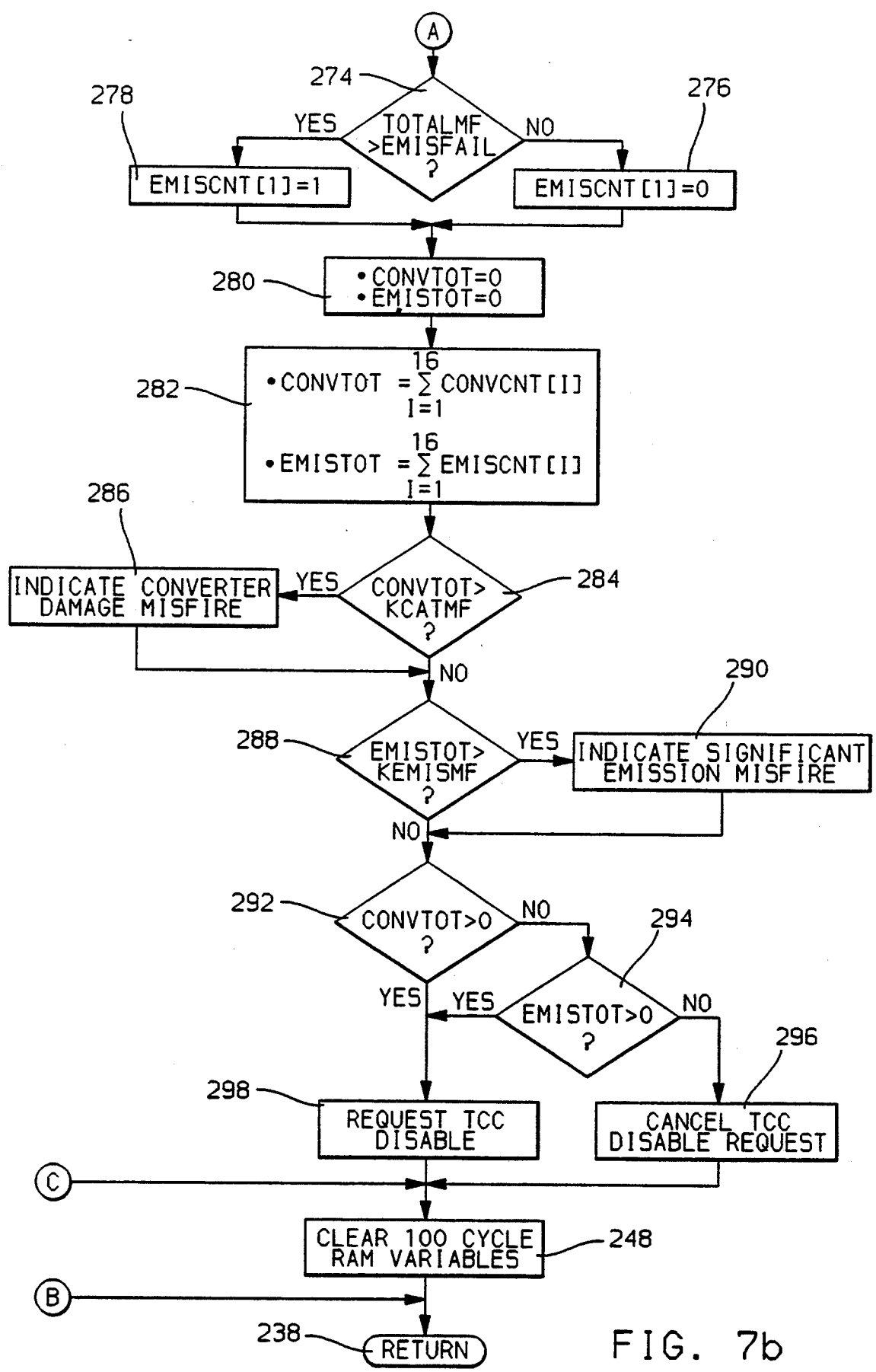

The routine called from step 146 of the routine of FIG. 5 is called 200REVS, is illustrated in FIG. 7, and is entered at step 240. The routine generally makes a final determination of whether a misfire occurred over the last 200 engine revolutions (which is 100 engine cycles in the four stroke engine of this embodiment), and determines what action if any should be taken as a result of any misfire determination.

Specifically, the routine moves from step 240 to step 242, to increment CYCCNT, a RAM based engine cycle counter. The counter is next compared to 100 at step 244. If it is less than 100, the 100 engine cycle test period is not yet complete, and the routine returns to the calling routine of FIG. 5, via step 238. Otherwise, 100 engine cycles of misfire information are available for analysis by the routine of FIG. 7, and the routine moves to step 246, to compare the ratio NOTRUEMF/TRUEMF to a calibrated value KNOTMF. The ratio NOTRUEMF/TRUEMF quantifies the relative proportion of engine speed disturbances not attributed to typical misfires to those disturbances that have been attributed to typical misfires over the most recent 100 engine cycles.

Experience has indicated that a more confident diagnosis of a misfire can be given if there have not been a significant number of recent likely false alarms. A disproportionate number of false alarms over the number of non-false alarms indicates that it is likely an "non-misfire" engine speed disturbance was acting over the last 100 engine cycles. The disturbance may have been improperly diagnosed over some of the engine cycles as a misfire, but was likely properly diagnosed for a substantial number of engine cycles during which a significant change in engine speed was detected.

The inventors have calibrated a ratio KNOTMF, which is the ratio of likely false alarms to likely true misfires above which it may be assumed that a disturbance, such as a rough road, was affecting vehicle speed in a manner similar to a misfire. Accordingly at step 246, if the ratio of NOTRUEMF/TRUEMF exceeds KNOTMF, calibrated to ¼ in this embodiment, the possible misfire data of the 100 cycle test period is assumed to have resulted from a "non-misfire" disturbance on engine speed, and the routine moves to step 248, to clear all counters to prepare to accumulate another 100 engine cycle block of information. Specifically at step 248, the following RAM variables are reset to zero: CYCCNT, TRUEMF, NOTRUEMF, and CYLCOUNT[I], for I=1 to 4. The routine then moves to step 238, where it is directed to return to the routine of FIG. 5.

Alternatively at step 246, if the ratio NOTRUEMF/TRUEMF is less than KNOTMF, the routine moves to step 247 to determine, if possible, if the vehicle is passing over a "rough road." Rough driving surfaces can introduce transient changes in the speed of the wheels of the vehicle. Depending on drivetrain compliance, the driven wheels of the vehicle may translate wheels speed changes back through the transmission (not shown) to the engine 10, causing transient changes in engine speed, which may appear to be misfires. To reliably detect misfires it is desirable to not attempt the misfire detection of this embodiment while the vehicle is traveling over rough surfaces.

Accordingly at step 247, if there is a rough road detection method or apparatus present on the vehicle for other applications, such as suspension control or brake control, the detection result is interrogated and no indication of a misfire is given while driving on such surfaces. Rather, the data is simply not analyzed further until the rough road condition passes. Specifically, if on a rough road at step 247, the routine moves to step 248, to clear the 100 cycle RAM variables, as discussed. However, if there is no rough road at step 247, the routine moves to step 250, to count the total number of misfires detected TOTALMF from all cylinders over the last 100 cycles as follows $$\text{TOTALMF} = \sum_{I=1}^{4} \text{CYCCOUNT}[I].$$

Next, the routine proceeds to step 252 to determine CONVFAIL, a RAM variable indicating the threshold above which a total number of misfires may cause damage to the vehicle catalytic converter (not shown). As is well-known in engine control, passing a sufficient quantity of unburnt fuel and oxygen to the converter can cause converter damage, which may reduce converter effectiveness. The quantity changes with engine speed and load, and thus CONVFAIL is a function of speed and load over the 100 engine cycles period being analyzed.

To estimate engine speed and load over the 100 cycle test period, the speed-load point is sampled at the start of the period and at the end of the period. A misfire level that may damage the converter is then determined for both speed-load points in a look-up table in ROM 26 (FIG. 1) for the start point and the end point, and the greater of the two is selected as representative of the speed-load threshold of catalytic converter damage for the entire period. The entries of the CONV() table may be calibrated as the highest number of total cylinder misfires over 100 engine cycles that a given catalytic converter can withstand for a given engine speed and load without significant risk of damage. Specifically, returning to step 252 of FIG. 7, CONVFAIL is selected as the larger of CONV(STARTRPM, STARTLOAD) and CONV(ENDRPM, ENDLOAD), the two table lookup values from the CONV lookup table.

After selecting CONVFAIL at step 252, the routine moves to select EMISFAIL at step 254, as the larger of EMIS(STARTRPM, STARTLOAD) and EMIS(ENDRPM,ENDLOAD), two table lookup values from the same engine speed and load points, where the entries of the table EMIS() may be calibrated as the highest number of total misfires over 100 engine cycles for given speed-load points that can be tolerated without significant increase in engine emissions, for instance emissions through the converter to the atmosphere of undesirable exhaust gas constituents.

After determining EMISFAIL at step 254, the routine moves to steps 260-278 to update CONVCNT[]

and EMISCNT[], two sixteen entry counters to record the recent history of comparison of TOTALMF and respectively, CONVFAIL and EMISFAIL. Specifically, the sixteen entries in the two counters indicate the result of the comparison for the most recent sixteen test periods. If TOTALMF exceeds CONVFAIL for a 100 cycle test period, the entry in the counter is set to one, otherwise the entry is cleared.

To carry out this counter update, the routine first moves to step 260, to set an index I to 15. The routine then advances to steps 262 through 266, to shift the entries in the two counters by one, lopping off the oldest (sixteenth) entry and making room for the new (first) entry according to the following generalized equations $$CONVCNT[I+1] = CONVCNT[I] \text{ for } I = 15 \text{ to } 1,$$
and
$$EMISCNT[I+1] = EMISCNT[I] \text{ for } I = 15 \text{ to } 1.$$

After shifting all entries of the two counters, the routine moves to step 268, to compare the present TOTALMF to CONVFAIL. If TOTALMF exceeds CONVFAIL, the routine sets the counter entry corresponding to the present test period CONVCNT[1] to one at step 272. Otherwise, the entry is set to zero at step 270.

Next, the routine checks the emission misfire limit at step 274, comparing TOTALMF to EMISFAIL. If TOTALMF exceeds EMISFAIL, the routine sets EMISCNT[1] to one at step 278, and otherwise clears the entry at step 276. The routine then proceeds to step 280, to clear CONVTOT and EMISTOT, which are counters to sum the total number of entries in the respective sixteen entry counters CONVCNT[] and EMISCNT[] that have been set to one. The totals are accumulated next at step 282 according to the following equations $$CONVTOT = \sum_{I=1}^{16} CONVCNT[I]$$

$$EMISTOT = \sum_{I=1}^{16} EMISCNT[I].$$

These totals are used as an indication of the persistence of the misfire condition, wherein a persistent alert condition, such as a misfire pattern that may damage the catalytic converter or may result in significant increase in undesirable emissions, should be communicated to the vehicle operator or to a service technician. Misfire conditions that are not long lasting are not communicated to the vehicle operator or to a service technician as they are not likely to be traceable to a significant problem or, in fact, do not present a significant problem.

Accordingly, after counting the number of misfire test periods over the most recent sixteen periods at step 282, the routine moves to step 284, to compare CONVTOT, the converter damage misfire condition total, to KCATMF a calibrated threshold set to one in this embodiment. If COBIVTOT exceeds KCATMF, an indication of the misfire condition is made next at step 286 to the vehicle operator so that operator-initiated action may be taken to remedy the condition. The indication may be flashing or steady illumination of a lamp on the vehicle instrument panel while storing information in non-volatile RAM (not shown) on the extent of the misfire, which may be accumulated in any convenient manner based on such values as CONVTOT and TOTALMF, and storing information on the relative culpability of the cylinders, such as by storing information on each of the four CYCCOUNT[] values.

After the comparison at step 284 and, if necessary, the indication at step 286, the routine moves to step 288 to determine whether EMISTOT exceeds a calibrated threshold KEMISMF. KEMISMF is set to 6 in this embodiment reflecting a determination of the maximum number of test periods indicating a significant misfire condition over the most recent sixteen test periods that will be tolerated before the operator or a service technician notification must be made. If EMISTOT exceeds KEMISMF at step 288, the routine moves to step 290 to indicate the potential for significant emissions to the vehicle operator. The indication may be provided in the manner described at step 286.

Whether or not the emission indication is given at step 290, the routine moves to steps 292 through 298, to request disengagement of the torque converter clutch TCC (not shown) if either CONVTOT or EMISTOT in^Fdicate that a potential misfire has been diagnosed over the last sixteen test periods. These steps are not executed in an embodiment of this invention wherein the present misfire detection is applied to a vehicle not having a TCC. However, in this embodiment wherein a four cylinder, four-stroke engine is coupled to an automatic transmission via a hydrodynamic converter with a TCC, these steps provide significant benefit the reliability of any misfire diagnosis.

The steps 292 through 298 attempt to increase the compliance of the drivetrain when a misfire is detected, to reduce the potential of a false alarm originating from changes in wheel speed that feed back into the drivetrain. By requesting that the TCC be released, the compliance of the hydrodynamic converter between the engine and transmission may increase, which may damp out road disturbances, allowing a more confident assessment of misfires thereafter. Accordingly, if at step 292 CONVTOT shows even one test period having significant misfire activity or, at step 294, if EMISTOT shows even one such period, a request will be made at step 298 that the TCC be unlocked. The request may be overridden by higher priority TCC activity, but otherwise the request will result in release of the TCC. The request will continue until no such misfire activity is present or has been present for the most recent 16 test periods. If no misfires are indicated in either counter CONVTOT or EMISTOT, then the routine moves to step 296 to cancel any request for TCC unlock. After steps 298 or 296 are carried out, the routine moves to step 248, to clear the 100 cycle RAM variables, as discussed. The routine then returns to step 146 of the routine of FIG. 5, via step 238.

This description of the preferred embodiment for the purpose of illustrating the invention is not to be taken as limiting or restricting the invention since many modifications may be made through the exercise of skill in the art without departing from the scope of the invention.

The embodiments of the invention in which an exclusive property or privilege are claimed are defined as follows:

1. A method for diagnosing malfunctions in an internal combustion engine having n cylinders and having an output shaft with a predetermined set of reference points, comprising the steps of:
    measuring predetermined engine parameters indicative of an engine operating point;

diagnosing malfunctions according to a first diagnostic method when the engine operating point is within a first predetermined region;

diagnosing malfunctions according to a second diagnostic method when the engine operating point is within a second predetermined region, wherein the second diagnostic method comprises the steps of:

calculating a first set of average speeds between a first predetermined set of adjacent reference points on the shaft;

calculating a first set of average speed changes as the difference between the calculated first set of average speeds and a previous calculated set of average speeds between the first predetermined set of adjacent reference points on the shaft;

comparing a predetermined function of the change in average speed to a predetermined average speed change threshold value; and indicating an engine malfunction when the predetermined function exceeds the average speed change threshold value.

2. The method of claim 1, wherein the second diagnostic method further comprises the steps of:

calculating a second set of average speeds between a second predetermined set of adjacent reference points on the shaft;

calculating a second set of average speed changes as the difference between a previous set of average speeds between the second set of adjacent reference points on the shaft and the calculated second set of average speeds;

determining a sum of the first set of average speed changes and the second set of average speed changes;

comparing a predetermined function of the sum to a predetermined sum threshold value; and indicating an engine malfunction when the predetermined function of the sum exceeds the sum threshold value.

3. The apparatus of claim 2, wherein the second diagnostic method further comprises the steps of:

sensing the passage of the reference points by a predetermined reference position;

determining the sum after each sensed reference point passage;

storing each determined sum;

calculating a malfunction index as a predetermined function of n consecutive stored sums;

comparing the calculated index to a predetermined index threshold value; and indicating an engine malfunction when the calculated index exceeds the predetermined index threshold value.

4. A diagnostic system for an engine having n cylinders and an output shaft undergoing two complete revolutions for each engine cycle during which each of the cylinders undergoes a complete cylinder cycle, the system comprising:

means for generating n/2 reference signals for each revolution of the output shaft, each reference signal being generated at a respective predetermined angular position of the output shaft so as to alternately represent a predetermined reference point in the cylinder cycle of each of two of the n cylinders;

means for timing the duration between each of adjacent reference signals during rotation of the output shaft thereby providing a pair of timed durations between each consecutive predetermined angular positions of the output shaft during each engine cycle;

means for determining a first difference between the timed duration in a first pair of timed durations; and means for indicating an engine malfunction when a predetermined function of the first difference exceeds a predetermined threshold.

5. The system of claim 4, further comprising:

means for determining a second difference between the timed duration in a second pair of timed durations; and means for determining a difference between the first and second differences; and wherein the means for indicating an engine malfunction further includes means for indicating an engine malfunction when a predetermined function of the difference exceeds a predetermined difference threshold value.

6. An apparatus for indicating malfunctions in an internal combustion engine having n cylinders and having an output shaft with a predetermined set of reference points, comprising:

means for calculating a first set of average speeds between a first predetermined set of adjacent reference points on the shaft;

means for calculating a first set of average speed changes as the difference between the calculated first set of average speeds and a previous calculated set of average speeds between the first predetermined set of adjacent reference points on the shaft;

means for comparing a predetermined function of the change in average speed to a predetermined average speed change threshold value; and means for indicating an engine malfunction when the predetermined function exceeds the average speed change threshold value.

7. The apparatus of claim 6, further comprising:

means for calculating a second set of average speeds between a second predetermined set of adjacent reference points on the shaft;

means for calculating a second set of average speed changes as the difference between a previous set of average speeds between the second set of adjacent reference points on the shaft and the calculated second set of average speeds;

means for determining a sum of the first set of average speed changes and the second set of average speed changes;

means for comparing a predetermined function of the sum to a predetermined sum threshold value; and means for indicating an engine malfunction when the predetermined function of the sum exceeds the sum threshold value.

8. The apparatus of claim 7, further comprising:

means for sensing the passage of the reference points by a predetermined reference position;

means for determining the sum after each sensed reference point passage;

means for storing each determined sum;

means for calculating an malfunction index as a predetermined function of n consecutive stored sums;

means for comparing the calculated index to a predetermined index threshold value; and means for indicating an engine malfunction when the calculated index exceeds the predetermined index threshold value.

* * * * *